UNITED STATES PATENT OFFICE.

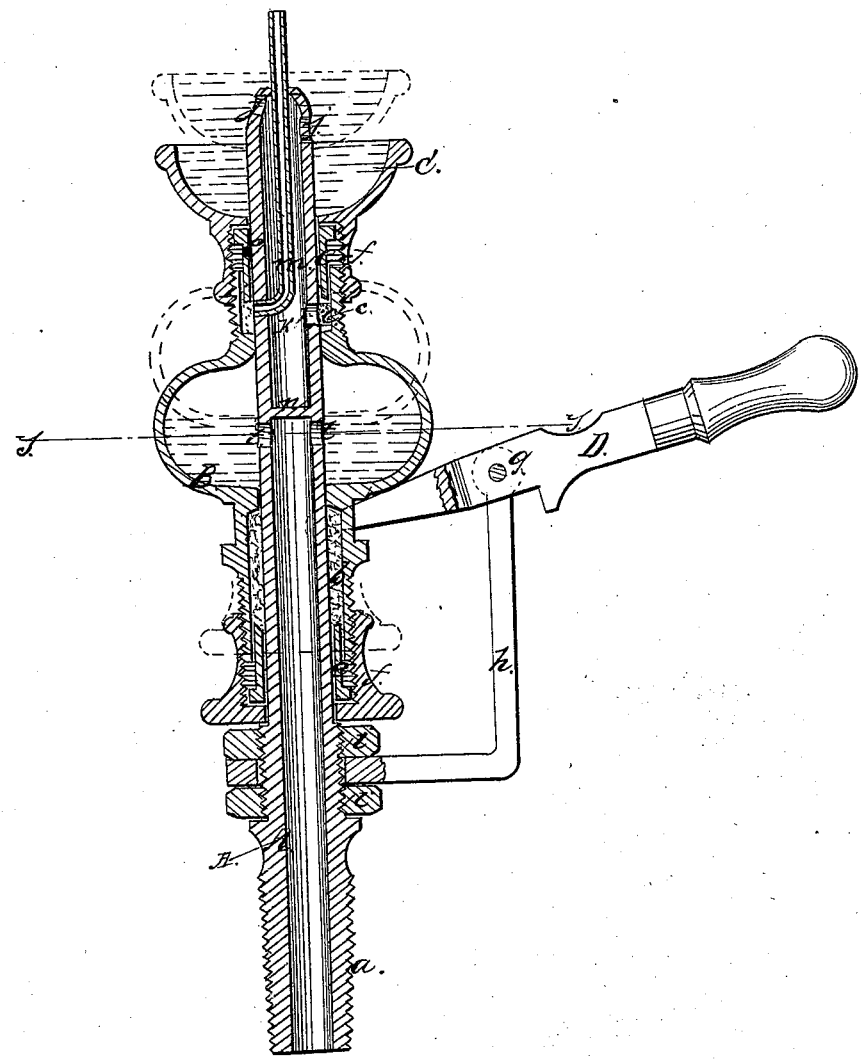
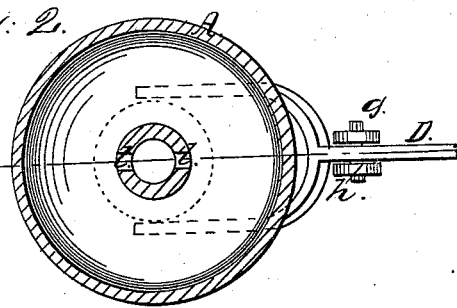

JACOB FOGLE, OF PUTNAM, OHIO.

IMPROVEMENT IN OIL-CUPS.

Specification forming part of Letters Patent No. 44,287, dated September 20, 1864.

*To all whom it may concern:*

Be it known that I, JACOB FOGLE, of Putnam, in the county of Muskingum and State of Ohio, have invented a new and Improved Oil-Cup; and I do hereby declare that the following is a full, clear, and exact description of the same, which will enable others skilled in the art to make and use the same, reference being had to the accompanying drawings, making a part of this specification, in which—

Figure 1 is a vertical central section of this invention, taken in the plane indicated by the line *x x*, Fig. 2. Fig. 2 is a horizontal section of the same, the plane or section being indicated by the line *y y*, Fig. 1.

Similar letters of reference indicate like parts.

This invention consists in a vertically and longitudinally sliding globe and oil-receiver, in combination with a tube leading to the steam-cylinder or other part to be lubricated, and provided with holes situated at different levels, and separated by a transverse partition, and with a vent-pipe in such a manner that by moving the globe in one direction it comes in the proper position to receive the lubricating material, and by moving it in the opposite direction it comes in the position to discharge said lubricating material into the cylinder or other part to be oiled.

A represents a tube provided with a screw-thread, *a*, at its bottom end, to screw into the steam-cylinder or other part to be oiled. The upper portion or stem of this tube is turned perfectly parallel, and it forms the guide for the longitudinal sliding globe B and receiving-cup C. The globe B is provided with a stuffing-box, *b*, below and with another stuffing box, *c*, above, and these stuffing-boxes consist of cavities to receive the packing, a sleeve or follower, *e*, to compress the packing within the cavities, and of a nut, *f*, to force the sleeves into the cavities. The nut of the stuffing-box *c* is formed by the shank of the receiving-cup, as clearly shown in Fig. 1 of the drawings. Motion is imparted to the globe and receiving-cup by a hand-lever, D, the forked end of which catches in a recess or neck under the globe. This hand-lever has its fulcrum on a pin, *g*, in a standard, *h*, which is secured to the tube A by means of two jam-nuts, *i*, or in any other suitable manner. The upper one of these nuts forms a stop to prevent the globe being pushed down any further than desirable. The tube A is provided with three sets of holes, *j k l*, and with a vent-pipe, *m*, which passes down through the center of said tube and out through its side, on a level, or nearly so, with the holes *k*. The holes *l* are situated below a horizontal partition, *n*, which divides the interior of the tube in two distinct compartments, and said holes serve to conduct the lubricating material from the globe to the cylinder or other part to be lubricated. They communicate with the interior of the globe if the same is in its lowest position, or only slightly raised, and in this position the holes *k* are completely closed, and the holes *j* are above the level of the oil in the receiving-cup. If it is desired to introduce some lubricating material into the globe, the hand-lever is depressed, and as the globe and receiving-cup rise the holes *l* are closed, and the holes *k* and vent-pipe *m* are brought in communication with the globe, as shown in Fig. 1 in red outlines. The holes *j* being then below the level of the lubricating material in the receiving-cup, the said material runs down through the tube A and passes through the holes *k* in the globe. The air or steam contained in said globe escapes through the vent-pipe. As soon as it is ascertained that the globe is filled, the hand-lever is brought back to its original position, carrying the globe and cup down to the position shown in black outlines in Fig. 1, and the steam from the cylinder or other piece to be oiled rushes through the holes *l* into said globe, causing the oil or lubricating material contained therein to run down to the cylinder or other part to be oiled through said holes.

This oil-cup is easily constructed. It is not liable to get leaky or out of order. The packing in the stuffing-boxes can be easily kept tight by tightening up the nuts *f*, and if it becomes necessary said packing can be readily renewed.

Having thus described my invention, what I claim as new, and desire to secure by Letters Patent, is—

1. The longitudinally-sliding globe B and receiving-cup C, in combination with the tube A, holes, *j k l*, and vent-pipe *m*, constructed and operating in the manner and for the purpose substantially as herein set forth.

2. The stuffing-boxes *b c*, above and below the oil-cup B, in combination with the pipe A, constructed and operating in the manner and for the purpose substantially as herein specified.

JACOB FOGLE.

Witnesses:
  H. B. TAYLOR,
  WM. PHILIPS.